US012746711B2

(12) United States Patent
Uchiyama

(10) Patent No.: US 12,746,711 B2
(45) Date of Patent: Sep. 29, 2026

(54) COMPRESSION MOLDING DEVICE AND COMPRESSION MOLDING METHOD

(71) Applicant: Yamaha Robotics Co., Ltd., Tokyo (JP)

(72) Inventor: Shigeyuki Uchiyama, Nagano (JP)

(73) Assignee: Yamaha Robotics Co., Ltd., Tokyo (JP)

( * ) Notice: Subject to any disclaimer, the term of this patent is extended or adjusted under 35 U.S.C. 154(b) by 47 days.

(21) Appl. No.: 18/557,962

(22) PCT Filed: Mar. 22, 2022

(86) PCT No.: PCT/JP2022/013050
§ 371 (c)(1),
(2) Date: Oct. 30, 2023

(87) PCT Pub. No.: WO2023/013150
PCT Pub. Date: Feb. 9, 2023

(65) Prior Publication Data

US 2024/0217144 A1 Jul. 4, 2024

(30) Foreign Application Priority Data

Aug. 4, 2021 (JP) ................................ 2021-127895

(51) Int. Cl.
*B29C 43/18* (2006.01)
*B29C 43/36* (2006.01)
(Continued)

(52) U.S. Cl.
CPC .............. *B29C 43/18* (2013.01); *B29C 43/36* (2013.01); *B29C 43/52* (2013.01);
(Continued)

(58) Field of Classification Search
CPC ......... B29C 43/18; B29C 43/36; B29C 43/52; B29C 2043/182; B29C 2043/3602;
(Continued)

(56) References Cited

U.S. PATENT DOCUMENTS 5,635,115 A * 6/1997 Konishi ............... H10H 20/852
257/E21.705
7,056,770 B2 6/2006 Uragami et al.
(Continued)

FOREIGN PATENT DOCUMENTS

CN 1503339 6/2004
CN 107437510 12/2017
(Continued)

OTHER PUBLICATIONS

English translation of JP-2010114192-A by EPO. (Year: 2010).*
(Continued)

*Primary Examiner* — Inja Song
(74) *Attorney, Agent, or Firm* — JCIPRNET

(57) ABSTRACT

The present invention addresses the problem of providing a compression molding device and a compression molding method capable of preventing deformation of electronic components and the like, mounted on a substrate, due to positional displacement of resin during transport, and capable of preventing variation in molding quality. As a solution to this problem, a compression molding device (1) according to the present invention uses a sealing die (202) provided with an upper die (204) and a lower die (206) to seal, by means of block-shaped resin (R), a substrate (Wa) on which an electronic component (Wb) is mounted, to process the same into a molded article, wherein the compression molding device is provided with a resin welding mechanism (110) for welding the resin (R) to a predetermined position on the substrate (Wa).

2 Claims, 8 Drawing Sheets

(51) Int. Cl.
*B29C 43/52* (2006.01)
*B29L 31/34* (2006.01)

(52) U.S. Cl.
CPC *B29C 2043/182* (2013.01); *B29C 2043/3602* (2013.01); *B29L 2031/3406* (2013.01)

(58) Field of Classification Search
CPC ... B29C 43/34; B29C 65/02; B29C 2043/181; B29L 2031/3406; H01L 21/56; H01L 21/67126; H01L 21/565; H01L 21/67098
See application file for complete search history.

(56) References Cited

U.S. PATENT DOCUMENTS

2004/0101631 A1* 5/2004 Uragami ................. H01L 24/97 427/430.1
2015/0311095 A1* 10/2015 Okada ................. H01L 23/4334 174/250

FOREIGN PATENT DOCUMENTS

JP H098179 1/1997
JP H098179 A * 1/1997 ............. H01L 24/97
JP 2004179284 6/2004
JP 2008060354 A * 3/2008 ............. H01L 24/97
JP 2010114192 5/2010
JP 2010114192 A * 5/2010
JP 2017209905 11/2017

OTHER PUBLICATIONS

English translation of JP-H098179-A by EPO. (Year: 1997).*
A blog of Twisted Traces—"PCB Board Size: What Should You Consider," in public at least one Nov. 30, 2020, available at https://web.archive.org/web/20201130054834/https://www.twistedtraces.com/blog/pcb-board-size-what-should-you-consider. (Year: 2020).*
English translation of JP-2008060354-A by EPO. (Year: 2008).*
"Office Action of Korea Counterpart Application", issued on Sep. 19, 2024, with English translation thereof, p. 1-p. 16.
"International Search Report (Form PCT/ISA/210) of PCT/JP2022/013050", mailed on Jun. 14, 2022, with English translation thereof, pp. 1-4.
"Office Action of Taiwan Counterpart Application", issued on Mar. 20, 2023, with partial English translation thereof, pp. 1-6.
"Office Action of Taiwan Counterpart Application", issued on Sep. 5, 2023, with partial English translation thereof, pp. 1-5.
"Office Action of China Counterpart Application", issued on Jun. 6, 2026, with English translation thereof, p. 1-p. 24.

* cited by examiner

COMPRESSION MOLDING DEVICE AND COMPRESSION MOLDING METHOD

CROSS-REFERENCE TO RELATED APPLICATION

This application is a 371 application of the International PCT application serial no. PCT/JP2022/013050, filed on Mar. 22, 2022, which claims the priority benefits of Japan Patent Application No. 2021-127895, filed on Aug. 4, 2021. The entirety of each of the above-mentioned patent applications is hereby incorporated by reference herein and made a part of this specification.

TECHNICAL FIELD

The invention relates to a compression molding device and a compression molding method.

RELATED ART

As an example of a resin sealing device and a resin sealing method in which a workpiece with an electronic component mounted on a substrate is sealed with a sealing resin (simply referred to as "resin" in the following) and the workpiece is processed into a molded article, a resin sealing device and a resin sealing method by using compression molding is known.

Compression molding is a technique for performing resin sealing through an operation in which a predetermined amount of resin is supplied to a sealed region (cavity) provided in a sealing die formed by including an upper die and a lower die, and a workpiece is provided in the sealed region to be clamped by using the upper die and the lower die. As an example, a technique of sandwiching a workpiece in which an electronic component (specifically, a semiconductor chip) is wire-bonded onto a substrate (specifically, a lead frame) by using resin to perform molding is known (Patent Document 1: Japanese Laid-open No. H09-008179).

CITATION LIST

Patent Literature

Patent Document 1: Japanese Laid-open No. H09-008179
Patent Document 2: Japanese Laid-open No. 2004-179284

SUMMARY OF INVENTION

Technical Problem

In general, a technique of mounting resin (e.g., resin in granular or liquid form) onto a substrate to be transported into the sealing die in a case where compression molding is performed on a workpiece in which an electronic component is wire-bonded to a substrate (generally a resin substrate, etc.) by using a sealing die having a cavity in an upper die is known. At this time, with the movement (positional displacement) of the resin, an issue that the resin may contact a wire of the workpiece and deform the wire may arise. Comparatively, a technique in which resin is mounted on a substrate after the substrate is moved into a sealing die is also known (see the second embodiment and FIGS. 4 and 5 of Patent Document 2: Japanese Laid-open No. 2004-179284). However, in the case of practicing such technique, the issue that the resin contacts a wire of a workpiece and deform the wire may also occur.

In addition, a technique that, in the case of performing compression molding on a workpiece in which multiple electronic components form a matrix and each resin is mounted with respect to each electronic component is known. At this time, an issue as follows may occur: when the resins are mounted on the substrate in order after the substrate is transported into a sealing die, the thermal history due to the heat from the heated sealing die is different between the resin at an early stage of the process and the resin at a later stage of the process.

Solution to Problem

In view of the above, an objective of the invention is to provide a compression molding device and a compression molding method capable of preventing deformation of electronic components and the like, mounted on a substrate due to positional displacement of resin during transport, and capable of preventing variation in molding quality.

The invention solves the above issue by using, as an embodiment, a solution as follows.

A compression molding device according to an embodiment uses a sealing die including an upper die and a lower die, and seals a substrate on which an electronic component is mounted by using a block-shaped resin to process the substrate into a molded article. The compression molding device is required to include: a resin welding mechanism, welding the resin to a predetermined position of the substrate.

Accordingly, at the time of transporting the workpiece and the resin into the sealing die, it can be arranged that the resin is welded to the predetermined position of the substrate. Therefore, an issue that the positional displacement of the resin R on the substrate at the time of transport occurs, and the resin contacts and deforms the electronic component (e.g., a wire-bonded location, etc.) can be solved.

In addition, in the case where compression molding is performed on a workpiece in which multiple electronic components are disposed on the substrate to form a matrix, at the stage before the workpiece is transported into the sealing die, respective resins can be mounted (welded, in the embodiment) to the respective electronic components on the substrate. Therefore, an issue of the variation in molding quality due to difference in thermal history, which may occur in the case where the resins are mounted in order after the substrate is transported into the sealing die can be solved. In addition, since the process of mounting the resin on the substrate and the pressing process (a process of closing the die) can be performed in parallel, there is no influence on tact.

In addition, in the case where compression molding is performed on a workpiece in which a substrate with a hole, such as a lead frame, is used, a resin supply method for transporting the substrate into the sealing die in a state in which the resin is held on the substrate can be realized.

The resin welding mechanism may also include: a substrate heating part, heating the substrate; and a transport and pressing part, mounting the resin to the predetermined position of the substrate in a state of being heated to a predetermined temperature, and pressing and welding the resin. In this way, by placing the resin onto the substrate heated to a temperature lower than the resin curing temperature, an effect that the surface of the resin is melt to be stuck to the substrate can be attained. Therefore, resin can be fixed to the substrate with a hole.

In addition, the resin welding mechanism may include: a resin heating part, heating the resin; and a transport and pressing part, mounting the resin in a state of being heated to a predetermined temperature to the predetermined position of the substrate, and pressing and welding the resin. In this way, by placing the resin heated to a temperature lower than the resin curing temperature onto the substrate, an effect that the surface of the resin is melt to be stuck to the substrate can be attained. Therefore, resin can be fixed to the substrate with a hole.

In addition, as the resin, a resin which has a cylindrically columnar shape or a prismatic columnar shape, and in which an accommodation recess or an accommodation hole having an inner diameter and a depth able to accommodate the electronic component is bored into a lower surface may be used. In this way, the resin can be welded onto the substrate by covering the electronic component from the top and surrounding the periphery of the electronic component.

In addition, as the resin, multiple resins may be used, and the resins may include a resin which has a cylindrically columnar shape or a square columnar shape and in which an accommodation recess or an accommodation hole having an inner diameter and a depth able to accommodate the electronic component is bored into a lower surface. In this way, detailed adjustments can be made depending on the type (specifically, the shape) of the workpiece, so as to optimize resin arrangement.

In a compression molding method according to an embodiment, a sealing die including an upper die and a lower die is used, and a substrate on which an electronic component is mounted is sealed by using a block-shaped resin to process the substrate into a molded article. The compression molding method is required to include: a resin welding process, welding the resin to a predetermined position of the substrate.

In a compression molding method according to another embodiment, a sealing die including an upper die and a lower die is used, and a substrate on which an electronic component is mounted is sealed by using a block-shaped resin to process the substrate into a molded article. The compression molding method is required to include: using, as the resin, a resin which has a cylindrically columnar shape or a square columnar shape and in which an accommodation recess or an accommodation hole having an inner diameter and a depth able to accommodate the electronic component is bored into a lower surface, and in the sealing die, placing the resin at a predetermined position of the substrate and performing compression molding. In this way, since the resin is placed on the substrate in the sealing die, an issue such as the positional displacement of the resin during transport does not arise as compared with the case where the resin is placed at a stage before the workpiece is transported into the sealing mold. Therefore, the molding quality can be prevented from deteriorating.

In a compression molding method according to another embodiment, a sealing die including an upper die and a lower die is used, and a substrate on which an electronic component is mounted is sealed by using a block-shaped resin to process the substrate into a molded article. The compression molding method is required to include: using, as the resin, a resin which has a plate shape with a predetermined thickness and in which an accommodation recess or an accommodation hole having an inner diameter and a depth able to accommodate the electronic component is bored into a lower surface. In this way, in the case where compression molding is performed on the workpiece in which multiple electronic components are disposed and form a matrix on the substrate, etc., by using the plate-shaped resin, the resin can be mounted on the substrate in one process. Therefore, it is possible to simplify and reduce the time of the process.

Effects of Invention

According to the invention, the issue that, at the time of transporting the workpiece, the position of the resin may be displaced on the substrate to deform the electronic component, etc., can be solved. In addition, for a workpiece in which multiple electronic components are mounted on the substrate, by mounting corresponding resins before the workpiece is transported into the sealing die, the issue that molding quality varies due to difference in thermal history among the resins can be solved.

DESCRIPTION OF EMBODIMENTS

First Embodiment (Overall Configuration)

Figure 1:
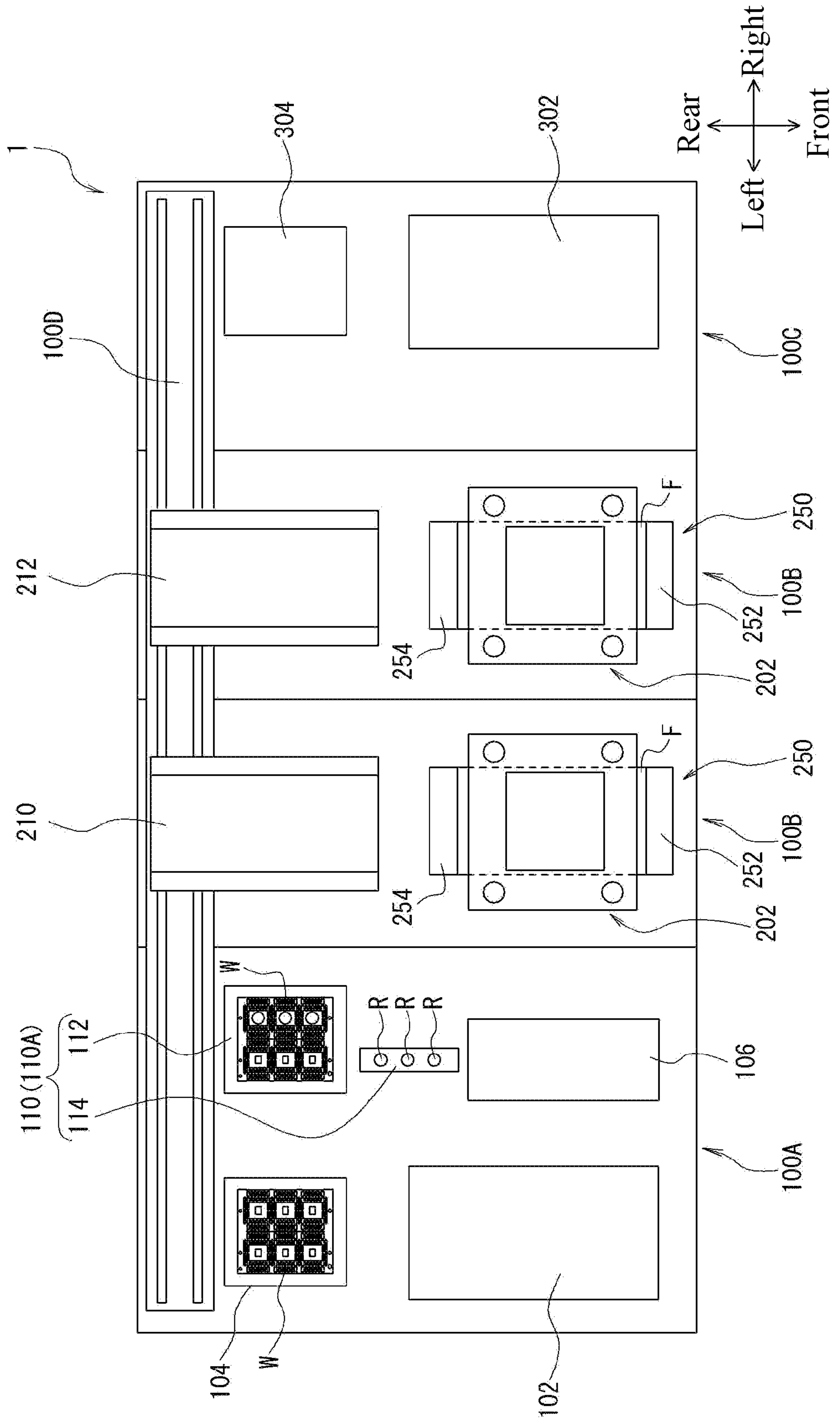
FIG. 1 is a plan view illustrating an example of a compression molding device according to an embodiment of the invention.
Figure 2:
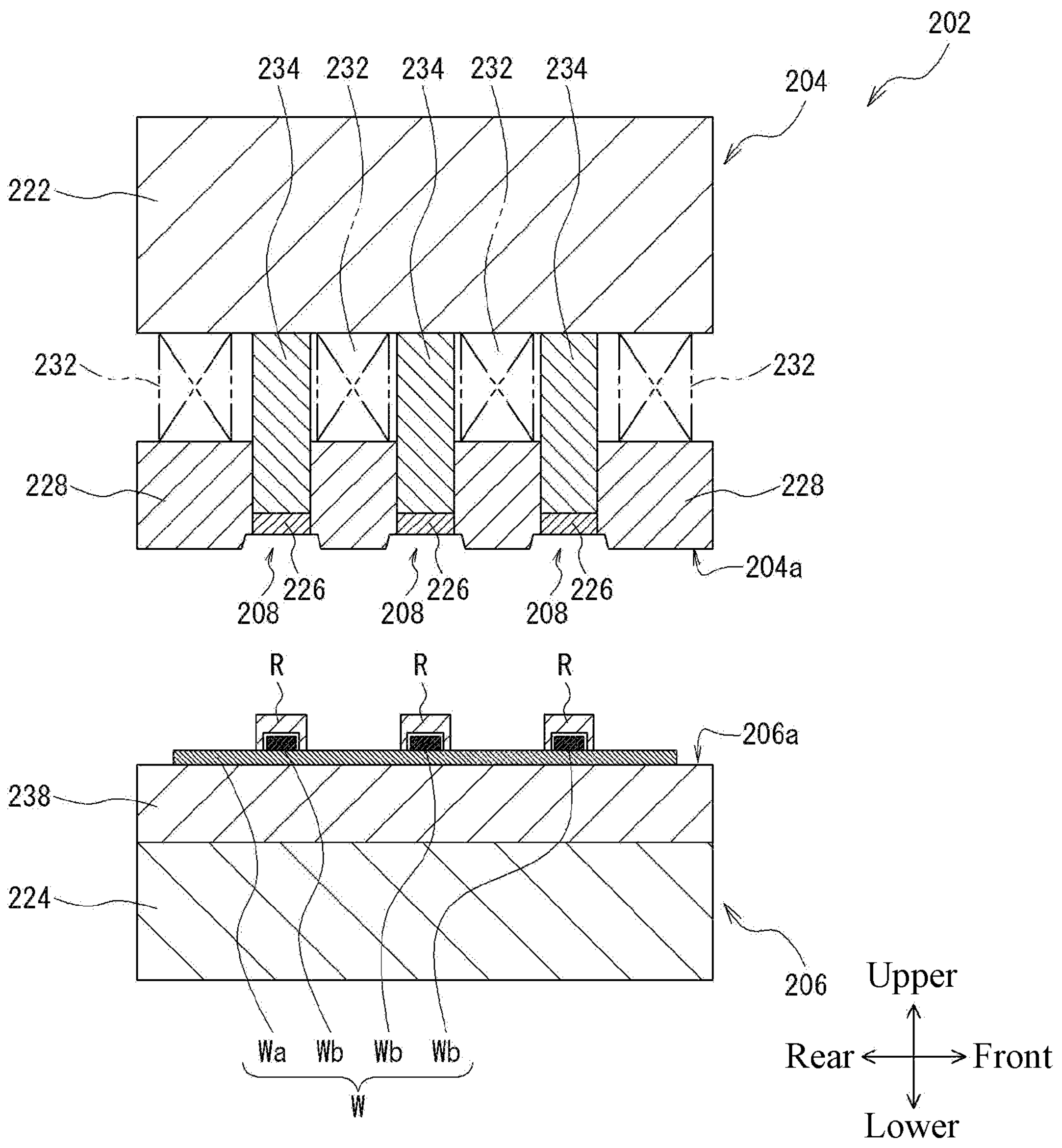
FIG. 2 is a cross-sectional view illustrating an example of a sealing die of the compression molding device of FIG. 1.

In the following, a first embodiment of the invention will be described in detail with reference to the drawings. FIG. 1 is a plan view (schematic view) illustrating an example of a compression molding device 1 according to the embodiment. In addition, FIG. 2 is a cross-sectional side view (schematic view) illustrating an example of a sealing die 202 of the compression molding device 1. For the ease of description, the front-rear direction, left-right direction, and upper-lower direction in the compression molding device 1 may be described by using arrows in the drawings. In addition, in all the views for describing the respective embodiments, components having the same functions may be labeled with the same symbols, and repetitive description of such components may be omitted.

The compression molding device 1 according to the embodiment is a device performing resin molding on a workpiece (molded article) W by using a sealing die 202 having an upper die 204 and a lower die 206. In the following, as the compression molding device 1, an example of a compression molding device in which a workpiece W on which a resin R is mounted is held by the lower die 206, a cavity 208 (including a portion of a die surface 204*a*) provided at the upper die 204 is covered by a release film (which may be simply referred to as "film" in the following) F to perform a clamp operation between the upper die 204 and the lower die 206 and perform resin sealing on the workpiece W by using the resin R is described.

Firstly, the workpiece W as a molding target has a configuration in which an electronic component Wb is mounted on a substrate Wa. More specifically, examples of the substrate Wa may include a lead frame, a resin substrate, a ceramic substrate, a metal substrate, a carrier plate, a wafer, etc., formed in a plate shape and an elongated rectangular shape (may also be in a circular shape). In addition, examples of the electronic component Wb may include a semiconductor chip, a MEMS chip, a passive element, a capacitor, a coil, a heat discharge plate, a conductive member, a spacer, etc.

As examples of the mounting process through which the electronic component Wb is mounted on the substrate Wa, examples may include mounting by wire bonding, flip-chip mounting, etc. Alternatively, in a case of a configuration in which the substrate Wa (carrier plate made of glass or metal) is peeled off from the molded article after resin molding, the electronic component Wb may also be attached by using an adhesive tape having thermal releasability or a ultraviolet curable resin cured through ultraviolet irradiation.

Figure 3:
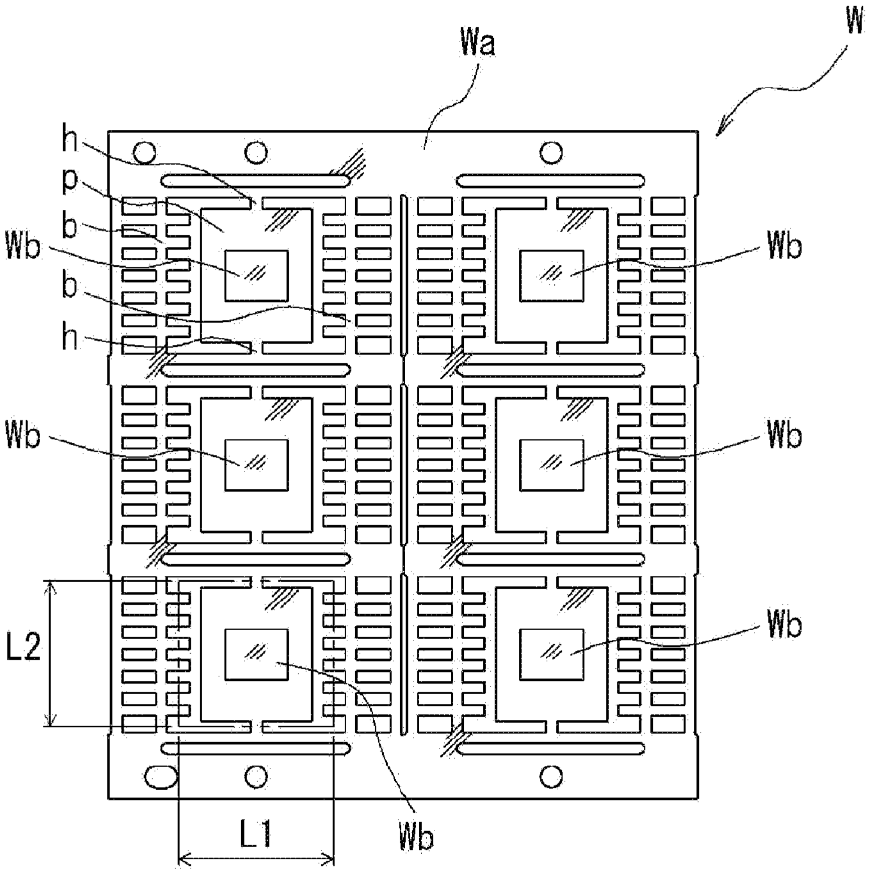
FIG. 3 is a plan view illustrating an example of a workpiece on which compression molding is performed by the compression molding device of FIG. 1.

Here, an example of the workpiece W is shown in FIG. 3. In the workpiece W, a lead frame is used as the substrate Wa, semiconductor chips are used as the electronic components Wb, respectively, and the electronic components (semiconductor chips) Wb are mounted, through wire bonding mounting, to form a matrix (matrix-like) on die pads P of the substrate (lead frame) Wa. It is noted that wires are not shown in the drawing. However, the mounting process is not limited thereto, other processes, such as flip-chip mounting, may also be used. Here, regarding the size of a resin-sealed package, a width L1 of the package is defined as less than a dimension between two (the two on the left and right in FIG. 3) dam bars b, b, and a length L2 of the package is defined as less than a dimension between two (two on the top and bottom in FIG. 3) suspension pins h. Like the conventional lead frame, multiple predetermined through holes are formed on the plate surface.

Then, as examples of a film F, a film material with high thermal resistance, peeling easiness, flexibility, and stretchability may be used as appropriate, such as polytetrafluoroethylene (PTFE), polytetrafluoroethylene polymer (ETFE), PET, FEP, fluorine-impregnated glass cloth, polypropylene, polyvinylidine chloride, etc. In the embodiment, a roll-like film is used as the film F. As a modified example, it may also be configured that a strip-shaped film is used (not shown).

Here, for the resin R according to the embodiment, a thermally curable resin (e.g., a filler-containing epoxy resin, etc.) formed to be block-like (lump-like) is used (details of which will be described in the following). As an example, the curing temperature of the resin R is about 100° ° C. to 200° C., and the temperature at which a surface portion starts melting is about 60° C. Nevertheless, the resin R is not limited thereto, and may also be a resin other than a thermally curable epoxy resin.

In the following, the outline of the compression molding device 1 according to the embodiment is described. As shown in FIG. 1, the compression molding device 1 includes, as main components, the following: a supply unit 100A, supplying the workpiece W and the resin R; a press unit 100B, supplying and storing (abandoning) the film F and performing resin sealing on the workpiece W to process the workpiece W into the molded article; and a storage unit 100C, storing the molded article after resin molding. In the embodiment, a configuration in which the upper die 204 is provided with a cavity 208, the workpiece W in which the resin R is mounted on the substrate Wa is held by the lower die, and the die is closed to obtain the molded article is described as an example. However, the configuration is not limited thereto.

In the embodiment, from left to right in the left-right direction, the supply unit 100A, the press unit 100B, and the storage unit 100C are arranged side-by-side in order. An arbitrary number of guide rails 100D are linearly provided across the respective units, a first loader 210 transporting the workpiece W and the resin R and a second loader 212 transporting the molded article are movably provided between predetermined units along the guide rails 100D.

In the compression molding device 1, the overall configuration can be changed by changing the configurations of the units. For example, the configuration shown in FIG. 1 is an example in which two press units 100B are disposed. However, a configuration in which one or three or more press units 100B are disposed is also possible. In addition, a configuration in which other units are disposed is also possible (none of which is shown).

(Supply Unit)

Then, the supply unit 100A included in the compression molding device 1 is described.

The supply unit 100A includes a supply magazine 102 storing multiple workpieces W and a preparation table 104 for mounting the workpiece W supplied from the supply magazine 102. For the supply magazine 102, a conventional stack magazine, slit magazine, etc., may be used. In addition, as a part for supplying (transporting) the workpiece W from the supply magazine 102 to the preparation table 104, a conventional pusher or transport rails, etc., are provided (not shown).

Moreover, the supply unit 100A includes: a resin supply part 106 storing and supplying multiple resins R; and a resin welding mechanism 110 welding the resin R to a predetermined position of the substrate Wa in the workpiece W (details of which will be described in the following).

Moreover, the supply unit 100A includes the first loader 210 transporting the workpiece W and the resin R. The first loader 210 has a holding mechanism for the workpiece W provided on the lower surface of the first loader 210. As an example, in the holding mechanism, a conventional mechanism (e.g., a configuration having holding claws for sandwiching, a configuration having a suction hole in communication with a suction device for sucking, etc.) is used (not shown).

Here, as an example of the resin welding mechanism 110 according to the embodiment, as indicated by a symbol 110A in FIG. 1, a welding mechanism 110A is configured to include: a substrate heating part 112 holding the workpiece W and heating the workpiece W (specifically, the substrate Wa) to a predetermined temperature (e.g., a temperature at which the resin R is not completely melted, such as 60° C.); and a transport and pressing part 114, mounting the resin R to a predetermined position of the substrate Wa in the state of being heated to the predetermined temperature, and pressing and welding the resin R. As an example, the substrate heating part 112 is configured to heat the substrate Wa by using a conventional heating mechanism (e.g., an electric wire heater, an infrared heater, etc.). It may also be configured that, differing from the substrate heating part 112, a preheating heater for heating in advance before the workpiece W is transported into the sealing die 202 is provided (not shown).

Figure 4A:
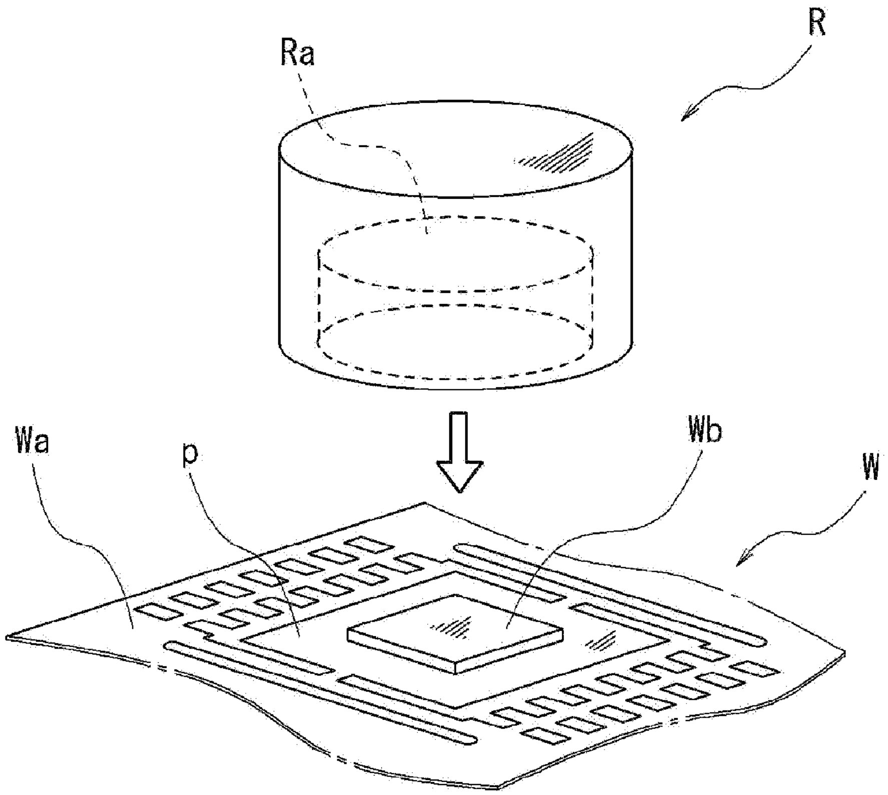
FIGS. 4A and 4B are views illustrating an example of a compression molding method according to an embodiment of the invention.
Figure 4B:
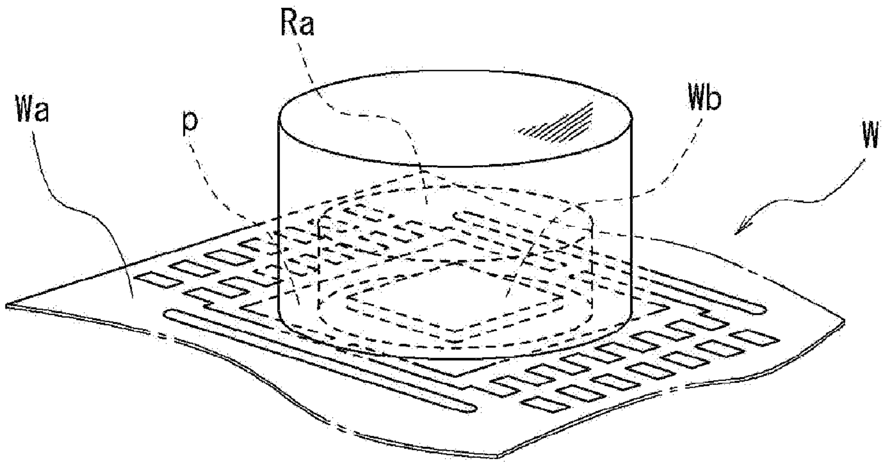

Meanwhile, the transport and pressing part 114 is configured to hold the block-like resin R supplied (transported) from the resin supply part 106 and be movable in a horizontal direction and a vertical direction. Therefore, it is possible to hold the resin R by using the transport and pressing part 114, pressing the resin R against the substrate Wa in the state of being heated to the predetermined temperature, and welding the resin R to the predetermined position of the substrate Wa. Here, FIG. 4A is a view illustrating the state before the resin R is welded to the predetermined position (onto the die pad p in the periphery of the electronic component Wb, etc.) of the substrate Wa, and FIG. 4B illustrates the state after the resin R is welded.

According to the configuration, by mounting the resin R to the substrate Wa heated to a temperature lower than the resin curing temperature, the surface of the resin R can be melted and stuck to the substrate Wa. Therefore, even for the workpiece W in which the substrate Wa having a through hole on a substrate surface, as exemplified by a lead frame, is used, the resin R can be mounted and fixed (welded) onto the workpiece W (that is, the substrate Wa). In addition, even in the case where compression molding is performed on such workpiece W having the through hole, like the case where the workpiece does not have the through hole, a resin supply method for transporting the substrate into the sealing die 202 in a state in which the resin R is held on the workpiece W (on the substrate Wa) can be realized.

In addition, at the time of transporting the workpiece W and the resin R into the sealing die 202, through the state in which the resin R is welded to the predetermined position of the substrate Wa, it is possible to solve issues as follows. Specifically, the issue that, at the time of transport, a positional displacement of the resin R on the substrate Wa occurs, and the resin R contacts and deforms the electronic component Wb (specifically, a portion of the wire of the electronic component Wb wire-bonded onto the substrate Wa) can be solved. In addition, at the stage before the workpiece W is transported into the sealing die 202, the respective resins R can be mounted (welded, in the embodiment) to the respective electronic components Wb on the substrate Wa. Therefore, the issue of the variation in molding quality due to difference in thermal history, which may occur in the case where the resins R are mounted in order after the substrate Wa is transported into the sealing die 202, can be solved. In addition, since the process of mounting the resins R on the substrate Wa and the pressing process (a process of closing the die) can be performed in parallel, there is no influence on tact.

Figure 5:
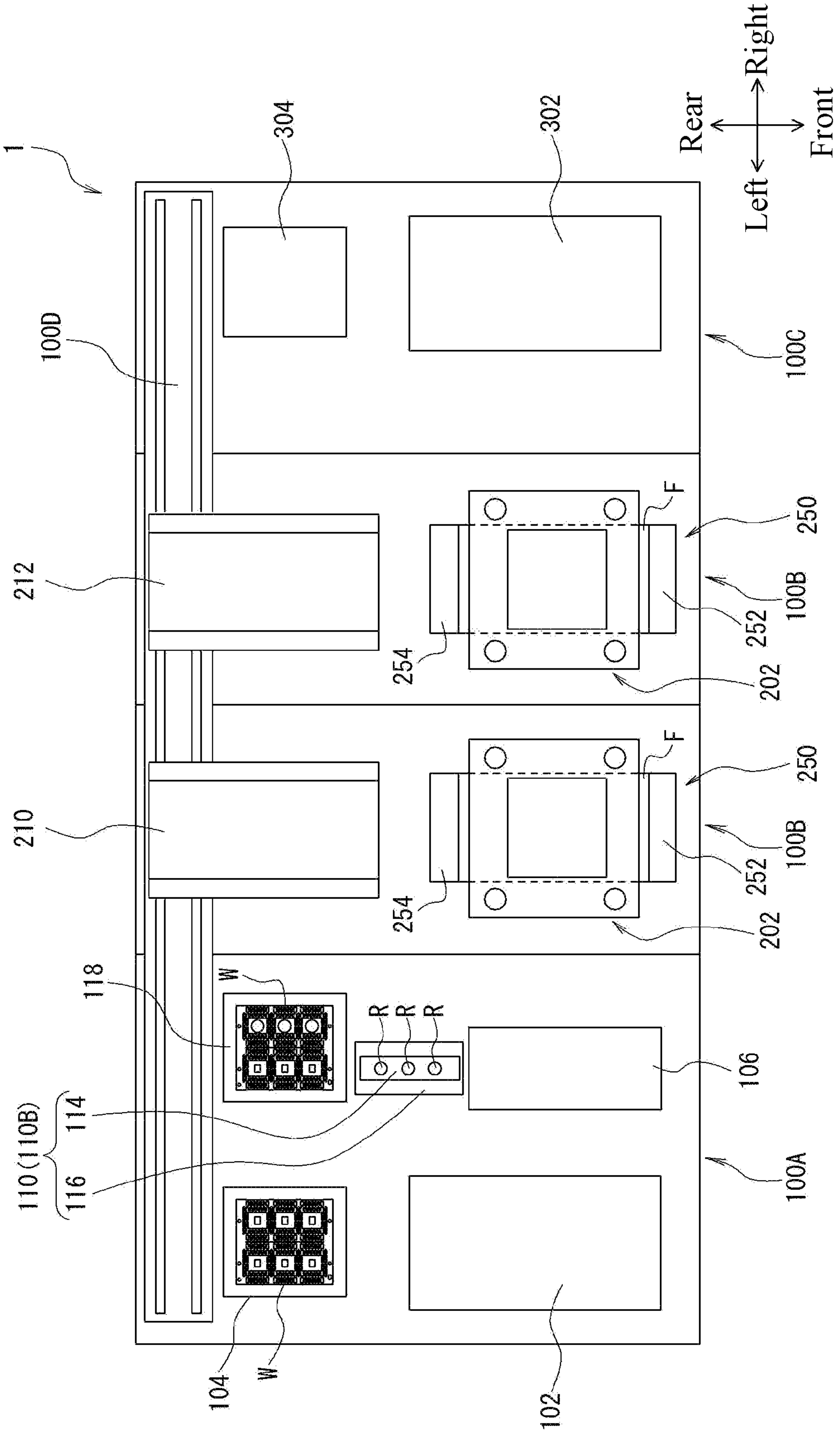
FIG. 5 is a plan view illustrating another example of the compression molding device according to the embodiment of the invention.

As another example of the resin welding mechanism 110, as indicated by a symbol 110B in FIG. 5, a welding mechanism 110B includes: a resin heating part 116 heating the resin R to a predetermined temperature (e.g., a temperature at which the resin R is not completely melted, such as 60° C.); and a transport and pressing part 114, mounting the resin R in the state of being heated to the predetermined temperature to a predetermined position of the workpiece W (more specifically, the substrate Wa) held on a table 118, and pressing and welding the resin R. According to the configuration, by mounting the resin R heated to a temperature (for example, about 60° C. as described above) lower than the resin curing temperature (as an example, about 100° C. to 200° C. as described above) to the substrate Wa, the surface of the resin R is melted to be stuck to the substrate Wa, so the resin R can be fixed onto the substrate Wa. Therefore, an effect the same as that of the above configuration example can be attained.

Figure 6A:
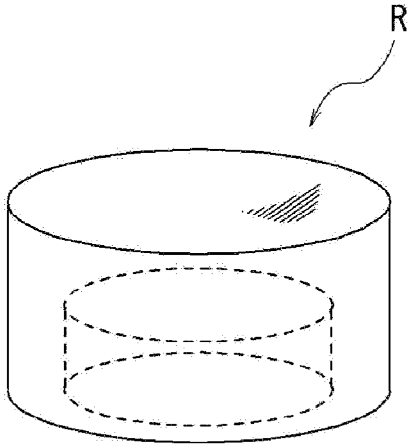
FIGS. 6A and 6B are perspective views illustrating an example of a resin used in the embodiment of the invention.
Figure 6B:
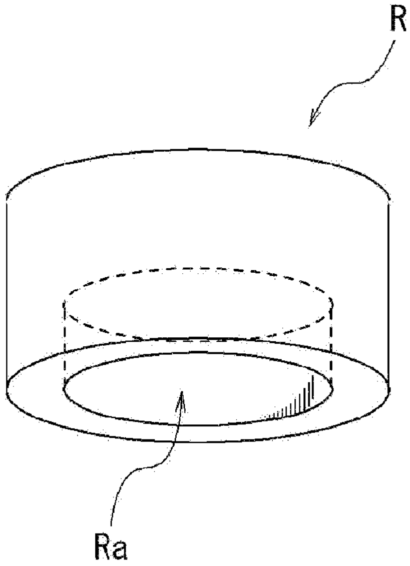
Figure 7A:
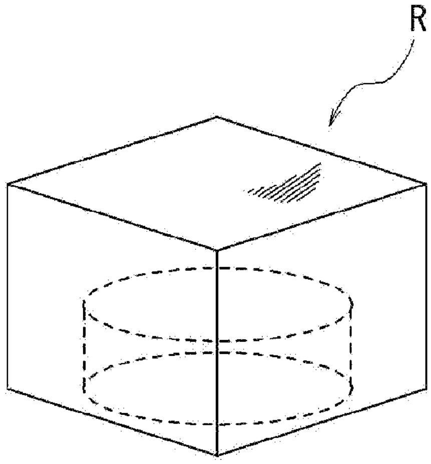
FIGS. 7A and 7B are perspective views illustrating another example of the resin used in the embodiment of the invention.
Figure 7B:
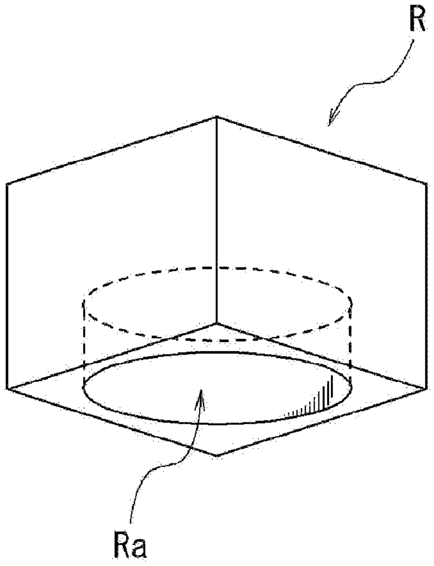

Here, as the resin R according to the embodiment, as shown in FIGS. 6A and 6B (FIG. 6A illustrates an upper-side perspective view, and FIG. 6B illustrates a lower-side perspective view), a resin which is in a cylindrically columnar shape and in which a non-penetrating accommodation recess (or a penetrating accommodation hole) Ra having an inner diameter and a depth able to accommodate the electronic component Wb is bored into the lower surface is used as appropriate. Specifically, the resin R is configured so that the inner diameter dimension of the accommodation recess (or accommodation hole) Ra in a plan view is greater than the outer diameter dimension of the electronic component Wb in a plan view. In place of the cylindrically columnar shape, the resin R may also be configured in a square columnar shape, as shown in FIGS. 7A and 7B (FIG. 7A illustrates an upper-side perspective view, and FIG. 7B illustrates a lower-side perspective view). Depending on the shape of the electronic component Wb, the shape of the accommodation recess Ra may also be the same as the shape of the electronic component Wb. For example, in the case of the electronic component Wb in a square columnar shape, the surface shape of the bottom surface of the accommodation recess Ra may also be a square shape. According to the configuration, the resin R can be welded onto the substrate Wa by covering the electronic component Wb from the top and surrounding the periphery of the electronic component Wb. Therefore, neither deformation nor positional displacement of the electronic component Wb occurs, and, a required amount of resin can be evenly supplied to the periphery of the electronic component. Thus, the quality of the molded article can be facilitated.

Figure 8:
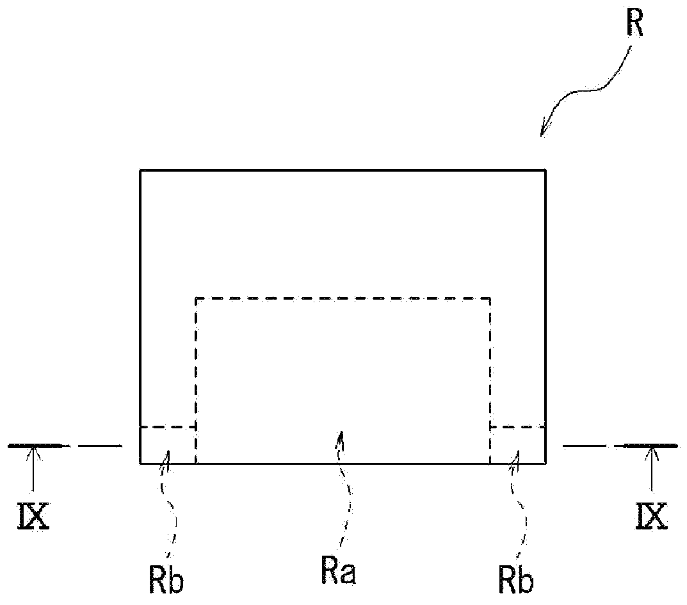
FIG. 8 is a side view illustrating another example of the resin used in the embodiment of the invention.
Figure 9:
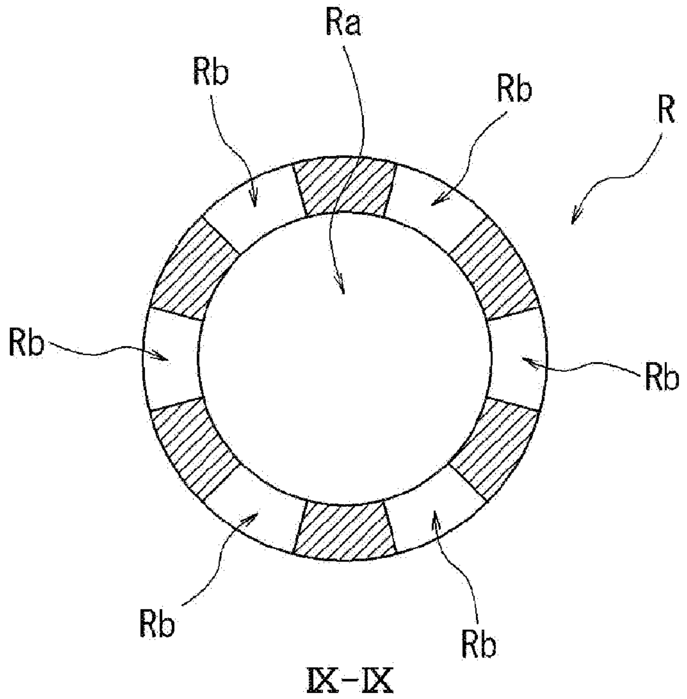
FIG. 9 is a cross-sectional view taken along an IX-IX line in FIG. 8.

Moreover, as a modified example of the resin R, as shown in FIG. 8 (a side view) and FIG. 9 (a cross-sectional view taken along an IX-IX line in FIG. 8), it may also be configured that a recessed groove Rb (that is, a region not contacting the upper surface of the substrate Wa) is provided on the lower surface welded to the substrate Wa. Accordingly, at the time of clamping the workpiece W by using the upper die 204 and the lower die 206, and heating and pressurizing the resin R to perform resin sealing (compression molding) on the workpiece W, the air inside the accommodation recess (or the accommodation hole) Ra can pass through the recessed groove Rb to be discharged easily. Therefore, a molding defect that residual air is contained in the molded article as a bubble can be prevented from occurring.

In the embodiment, it is configured that one resin R including the above configuration is used. However, the invention is not limited thereto. It may also be configured that multiple resins, with the resin R and other resins, are used (not shown). Accordingly, it is possible to make detailed adjustments depending on the type (specifically, the shape) of the workpiece W, so as to optimize resin arrangement.

(Press Unit)

Then, the press unit 100B included in the compression molding device 1 is described.

The press unit 100B includes the sealing die 202. The sealing die 202 has a pair of dies (such as multiple die blocks, die plates, die pillars, etc., or those to which other components are assembled that are formed of alloy tool steel) that are opened and closed. A conventional configuration may be adopted for the sealing die 202.

In the embodiment, in the pair of dies, the one on the upper side in the vertical direction is set as the upper die 204, and the other die on the lower side is set as the lower die 206. In the sealing die 202, the die is closed/opened as the upper die 204 and the lower die 206 move toward/away from each other. That is, the vertical direction (upper-lower direction) is set as a die opening/closing direction.

It is noted that a die-opening/closing mechanism performing die opening/closing of the sealing die 202 is configured to include: a pair of platens; multiple linking mechanisms (tie bars or pillars) to which the pair of platens are installed; and a driving source (e.g., an electric motor) and a driving transmission mechanism (e.g., a ball screw or a toggle link mechanism) able to move (lift or lower) the platens (none of which is shown).

Here, the sealing die 202 is arranged between the pair of platens in the die-opening/closing mechanism. In the embodiment, the upper die 204 is assembled to a fixed platen (platen fixed to the linking mechanism), and the lower die 206 to a movable platen (platen lifted or lowered along the linking mechanism) (not shown). However, the configuration is not limited thereto. It may also be that the upper die 204 is assembled to the movable platen, and the lower die 206 is assembled to the fixed platen, or the upper die 204 and the lower die 206 are both assembled to the movable platen.

In the following, the upper die 204 of the sealing die 202 is described. As shown in FIG. 2, the upper die 204 is configured to include an upper plate 222, a cavity piece 226, and a clamper 228, etc. In the embodiment, the cavity 208 is provided on the lower surface (surface on the side of the lower die 206) of the upper die 204. In the embodiment, the case where the workpiece W in which multiple electronic components Wb are arranged on the substrate Wa is collectively sealed with resin is described as an example, and it is configured that multiple cavities 208 are provided in correspondence with the arrangement of the electronic components Wb. However, the configuration is not limited thereto. There may also be a case with a configuration in which a workpiece in which one electronic component Wb is mounted on each substrate Wa serves as the sealing target, and one cavity is provided.

Here, as a specific configuration example of the periphery of the cavity 208, the cavity piece 226 is fixed and assembled to the lower surface of the upper plate 222 via a cavity block 234. The cavity piece 226 and the cavity block 234 may also be an integral component. Meanwhile, the clamper 228 is configured in an annular shape to surround the cavity piece 226, and the clamper 228 is spaced apart (floating) with respect to the lower surface of the upper plate 222 by using a biasing member 232 and assembled to be movable in the upper-lower direction. The cavity piece 226 forms a deep part (bottom part) of the cavity 208, and the clamper 228 forms a side part of the cavity 208. Here, the outer diameter dimension of the cavity piece 226 in a plan view is configured to be smaller than the outer diameter dimension of the cavity 208 in a plan view.

In addition, in the embodiment, a suction mechanism (not shown) that sucks and holds the film F supplied from a film supply mechanism 250 (to be described afterwards) at the upper die 204 is provided. Accordingly, it is possible to suck and hold the film F at a die surface 204*a* including the inner surface of the cavity 208.

In addition, in the embodiment, an upper die heating mechanism heating the upper die 204 to a predetermined temperature is provided. The upper die heating mechanism includes a heater (e.g., an electric wire heater), a temperature sensor, a controller, a power source, etc., (none of which is shown), and performs heating and heating control. As an example, the heater is configured as being built in the upper plate 222 or a die base (not shown) accommodating the upper plate 222, and mainly heats the entire upper die 204 and the resin R. Accordingly, the upper die 204 is adjusted and heated to the predetermined temperature (e.g., 100° C. to 200° C.).

In addition, in the embodiment, the film supply mechanism 250 transporting (supplying) the film F that is roll-like and has no opening (hole) on the sheet surface into the sealing die 202 is provided. The film supply mechanism 250 is configured to include an unwinding part 252 and a winding part 254 and transport the film F from the unwinding part 252 toward the winding part 254. Accordingly, the film F is supplied to the sealing die 202 disposed between the unwinding part 252 and the winding part 254.

Then, the lower die 206 of the sealing die 202 is described. As shown in FIG. 2, the lower die 206 is configured to include a lower plate 224 and a plate 238, etc. Here, the plate 238 is fixed and assembled to the upper surface (surface on the side of the upper die 204) of the lower plate 224.

In addition, in the embodiment, a workpiece holding mechanism holding the workpiece W at a predetermined position on the upper surface of the plate 238 is provided. As an example, the workpiece holding mechanism is in communication with the suction device via a suction path arranged by penetrating through the plate 238 and the lower plate 224 (not shown). Accordingly, it is possible to suck and hold the workpiece W at a die surface 206*a* (referring to the upper surface of the plate 238 here). As the workpiece holding mechanism, in place of the sucking mechanism or together with the sucking mechanism, it may also be configured to provide holding claws sandwiching the outer circumference of the workpiece W.

In addition, in the embodiment, a lower die heating mechanism heating the lower die 206 to a predetermined temperature is provided. The lower die heating mechanism includes a heater (e.g., an electric wire heater), a temperature sensor, a controller, a power source, etc., (none of which is shown), and performs heating and heating control. As an example, the heater is configured as being built in the lower plate 224 or a die base (not shown) accommodating the lower plate 224, and mainly heats the entire lower die 206 and the workpiece W. Accordingly, the lower die 206 is adjusted and heated to the predetermined temperature (e.g., 100° C. to) 200° ° C.

(Storage Unit)

Then, the storage unit 100C included in the compression molding device 1 is described.

The storage unit 100C includes: a storage table 304, in which the molded article sealed with resin is mounted; and a storage magazine 302, storing multiple molded articles. For the storage magazine 302, a conventional stack magazine, slit magazine, etc., may be used. In addition, as a part for storing (transporting) the molded article from the storage table 304 to the storage magazine 302, a conventional pusher or transport rails, etc., are provided (not shown).

In addition, the storage unit 100C includes the second loader 212 transporting the molded article. The second loader 212 has a holding mechanism for the molded article provided on the lower surface of the second loader 212. As an example, in the holding mechanism, a conventional mechanism (e.g., a configuration having holding claws for sandwiching, a configuration having a suction hole in communication with a suction device for sucking, etc.) is used (not shown).

(Resin Sealing Operation)

Then, an operation of performing resin sealing by using the compression molding device 1 according to the embodiment (i.e., a compression molding method according to the embodiment) is described. Here, the case where the workpiece W in which multiple electronic components Wb (semiconductor chips, for example) are loaded onto (mounted to) the substrate Wa (a lead frame, for example) to form a matrix is held at the lower die 206, and resin molding is collectively performed is adopted as an example.

Firstly, a heating process (upper die heating process) of adjusting and heating the upper die 204 to the predetermined temperature (e.g., 100° C. to 200° C.) by using the upper die heating mechanism is performed. Then, a process (lower die heating process) of adjusting and heating the lower die 206 to the predetermined temperature (e.g., 100° ° C. to 200° C.) by using the lower die heating mechanism is performed.

Then, a process of supplying the workpiece W from the supply magazine 102 and mounting the workpiece W onto the preparation table 104 is performed. Preceding or following such process, a process of transporting (sending out) the film F from the unwinding part 252 to the winding part 254 by using the film supply mechanism 250, and supplying the film F to the predetermined position (the position between the upper die 204 and the lower die 206) in the sealing die 202 to suck and hold the film F on the die surface 204*a* including the inner surface of the cavity 208 is performed.

Then, a process of supplying multiple resins R from the resin supply part 106 and a resin welding process of welding the resins R to the predetermined positions of the substrate W in the workpiece W are performed. Here, as an example of the resin welding process, processes as follows are included and implemented (see FIGS. 4A and 4B): a substrate Wa heating process of heating the substrate Wa to the predetermined temperature (temperature that the resins R are not completely melted (e.g., 60° C.)) and a transport and pressing process of mounting the resins R to the predetermined positions of the substrate Wa that is in the state of being heated to the predetermined temperature and pressing and welding the resins R. Accordingly, the resins R can be welded to the predetermined positions of the substrate Wa. Therefore, as described above, even in the case where a lead frame is used as the substrate Wa, the resins R can be mounted onto the workpiece W and transported into the sealing die 202. Also, the positional displacement of the resins R during transport, etc., can be prevented from occurring, so, particularly in the resin molding of products with wires, damages to the wires can be prevented, and molding quality remains favorable.

Here, the resin welding process may include the following as appropriate: a process of fitting, into the substrate Wa, the resins R which have a cylindrically columnar shape or a square columnar shape and in which the accommodation recesses (or accommodation holes) Ra having an inner diameter and a depth able to accommodate the electronic components Wb are bored into the lower surfaces, so that the electronic components Wb are accommodated in the accommodation recesses (or accommodation holes) Ra; and a process of welding the outer edges of the accommodation recesses (or accommodation holes) Ra on the lower surfaces of the resins R to the positions surrounding the electronic components Wb in the substrate Wa. Accordingly, the resins R can be welded onto the substrate Wa by covering the electronic components Wb from the top and surrounding the peripheries of the electronic components Wb.

Here, as another example of the resin welding process, processes as follows may be included and implemented: a resin heating process of heating the resins R to the predetermined temperature (temperature that the resin R is not completely melted (e.g., 60° C.); and a transport and pressing process of mounting the resins R in the state of being heated to the predetermined temperature to the predetermined position of the substrate Wa and pressing and welding the resins R. With such configuration as well, the same effect as the above configuration example can be attained.

Then, a process of transporting, by using the first loader 210, the workpiece W in the state in which the resins R are welded into the sealing die 202, and holding the workpiece W at the predetermined position of the lower die 206 is performed. It may also be that, before transporting the workpiece W into the sealing die 202 by using the first loader 210, a process of heating the workpiece W in advance may be further included and performed.

In the subsequent process, by performing the same process as the conventional compression molding process, the sealing die 202 is closed, two workpieces W are clamped by the upper die 204 and the lower die 206, and a process of heating and pressurizing the resins R with respect to the workpieces W is performed. Accordingly, the resins R are thermally cured, and resin sealing (compression molding) is completed. Then, a process of opening the sealing die 202 and separating the molded article and the film F is performed. Then, a process of transporting the molded article from the sealing die 202 is performed by using the second loader 212. In addition, by transporting the film F from the unwinding part 252 to the winding part 254 by using the film supply mechanism 250, a process of sending out the film F having been used is performed (film discharging process).

The above are the main processes for performing resin sealing by using the compression molding device 1. However, the above order of processes is merely an example, and, as long as there is no problem, it is possible to modify the order or perform the processes in parallel. For example, in the embodiment, the compression molding device including multiple (two, for example) press units is used. Therefore, by executing the processes in parallel, it is possible to form molded articles efficiently.

Second Embodiment

In the following, a second embodiment of the invention will be described. Compared with the first embodiment, the embodiment has a difference in the process of supplying the resins R. In the following, the difference will be described.

In the first embodiment, it is configured that the resin welding process of welding the resins R to the predetermined positions of the substrate Wa in the workpiece W is performed at a stage before the workpiece W is transported into the sealing die 202. Comparatively, in the embodiment, after the state in which the workpiece W is transported into the sealing die 202 and the workpiece W is held at the predetermined position (specifically, the predetermined position in the lower die 206) is arranged, in the sealing die 202, a process of placing the resins R to the predetermined positions of the workpiece W (specifically, the substrate Wa) is performed. Then, it is configured that the die is closed and compression molding is performed. The configuration (form) of the resin R is the same as that of the first embodiment.

Accordingly, since the resins R are placed on the substrate Wa in the sealing die 202, an issue such as the positional displacement of the resins R during transport does not arise, as compared with the case where the resins R are placed at a stage before the workpiece W is transported into the sealing mold 202. Therefore, the deformation of the workpiece W (specifically, wires) that may occur due to the positional displacement of the resins R can be prevented. Regarding the process of placing (mounting) the resins R, since welding is not a required configuration, a heating mechanism or process for welding and a pressing mechanism or process are not required, and the device as well as the process can be simplified.

Third Embodiment

In the following, a third embodiment of the invention will be described. Compared with the first and second embodiments, the embodiment has a difference in the configuration of the resin R that is used. In the following, the difference will be described.

In the first embodiment, the resin R is in a configuration which has a cylindrically columnar shape or a square columnar shape and in which the accommodation recess (or accommodation hole) having an inner diameter and a depth able to accommodate the electronic component Wb is bored into the lower surface, and one resin R corresponds to one electronic component Wb.

Comparatively, it is configured to use the resin R which has a plate shape with a predetermined thickness and in which the accommodation recess (or accommodation hole) having an inner diameter and a depth able to accommodate the electronic component Wb is bored into the lower surface.

Figure 10A:
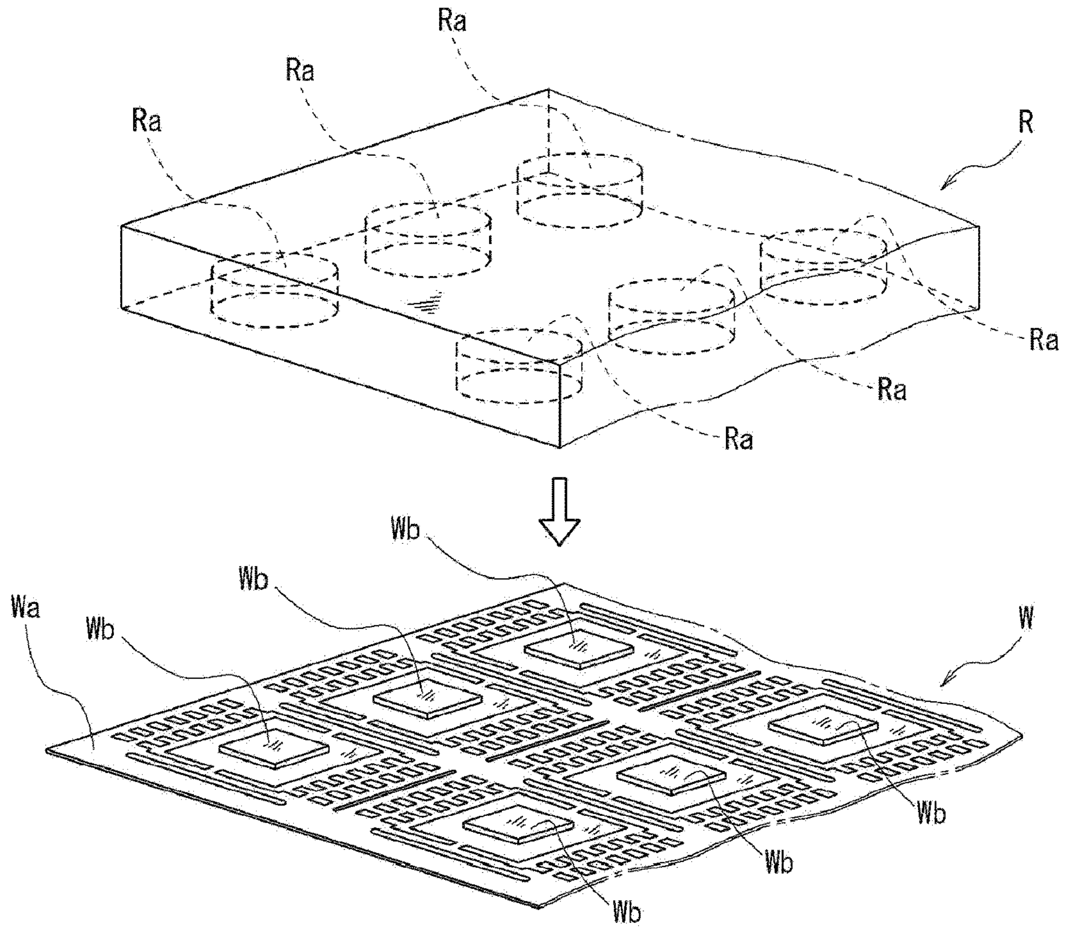
FIGS. 10A and 10B are views illustrating another example of the compression molding method according to the embodiment of the invention.
Figure 10B:
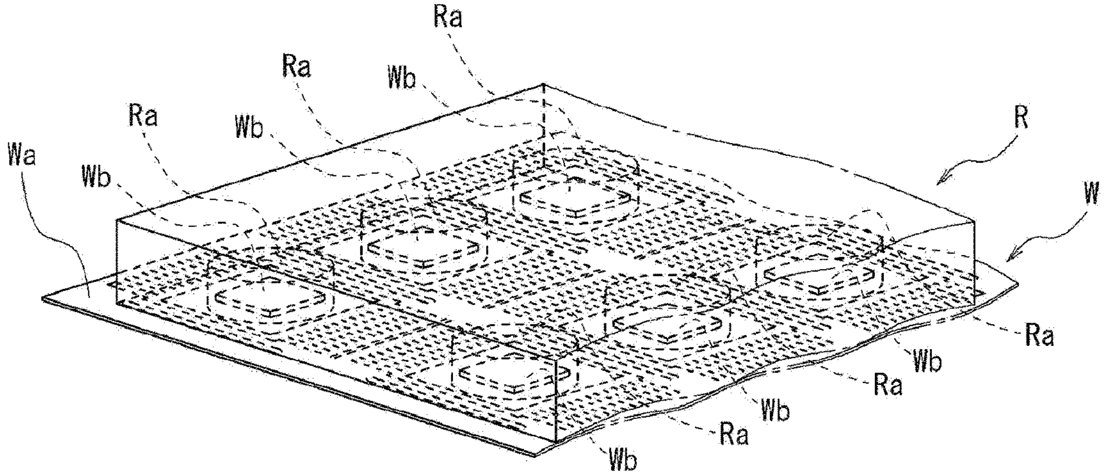

As a specific operation example, the resin R is mounted onto the substrate Wa so that multiple electronic components Wb are respectively accommodated in corresponding accommodation recesses (or accommodation holes). Here, FIG. 10A is a figure illustrating the state before the resin R is mounted onto the substrate Wa, and FIG. 10B is a figure illustrating the state after the resin R is mounted onto the substrate Wa. By using the resin welding mechanism same as the first embodiment, the resin R is welded to the substrate Wa. The accommodation recess (or accommodation hole) Ra may also be provided individually for each electronic component Wb, and it may also be that one accommodation recess (or accommodation hole) Ra is provided for multiple electronic components Wb.

Accordingly, for example, in the case where compression molding is performed on the workpiece W in which multiple electronic components Wb are disposed and form a matrix on the substrate Wa, etc., the resin R can be mounted on the substrate Wa in one process by using the plate-shaped resin. Therefore, it is possible to simplify and reduce the time of the process.

As described above, according to the invention, the following issue can be solved: at the time of transporting the workpiece, the position of the resin may be displaced on the substrate to deform the electronic component, etc. In addition, for a workpiece in which multiple electronic components are mounted on the substrate, if a configuration of mounting corresponding resins before the workpiece is transported into the sealing die is further provided, the issue that molding quality varies due to difference in thermal history among resins can be solved. Therefore, molding quality can be stabilized (high quality can be maintained).

The invention is not limited to the above embodiments, and can be modified in various ways without departing from the scope of the invention. For example, in the above embodiments, a configuration in which multiple cavities are provided in the upper die is described as an example. However, the invention is not limited thereto. The invention is also applicable to a configuration in which one cavity is provided in the upper die.

Also, in the above embodiments, a compression molding device including cavities in the upper die is described as an example. However, the invention is also applicable to a compression molding device including cavities in the lower die. In such case, it suffices as long as the resin is welded to be transported into the sealing die, so as not to drop with respect to the lower surface of the workpiece.

In addition, in the above embodiments, a workpiece in which electronic components are mounted on the substrate through wire bonding mounting is described as an example. However, the invention is also applicable to a workpiece in which electronic components are mounted on the substrate through flip-chip mounting.

What is claimed is:

1. A compression molding method comprising:

a resin sealing process of sealing a substrate on which an electronic component is mounted by using a block-shaped resin, within a sealing die comprising an upper die and a lower die, to process the substrate into a molded article;

a resin supply step of supplying, as the block-shaped resin, a plurality of resins each having a cylindrically columnar shape or a prismatic columnar shape and having a lower surface in which an accommodation recess or an accommodation hole having an inner diameter and a depth able to accommodate the electronic component is bored; and a resin welding process that is performed when the substrate is disposed outside of the sealing die, of partially melting and placing each of the plurality of resins at a predetermined position of the substrate respectively and then welding the plurality of resins on the substrate by the partially melted resins.

2. A compression molding method comprising:

sealing a substrate on which an electronic component is mounted by using a resin, within a sealing die comprising an upper die and a lower die, to process the substrate into a molded article, using, as the resin, a resin which has a plate shape with a predetermined thickness and in which a plurality of accommodation recesses or a plurality of accommodation holes is bored into a lower surface, each of the plurality of accommodation recesses or each of the plurality of accommodation holes having an inner diameter and a depth able to accommodate the electronic component, and partially melting and placing the resin at a predetermined position of the substrate and then welding the resin on the substrate by the partially melted resin when the substrate is disposed outside of the sealing die.

* * * * *